G. Clark, Jr. & L. P. Jenks,
Bread Machine.
Nº 52,678.      Patented Feb. 20, 1866.
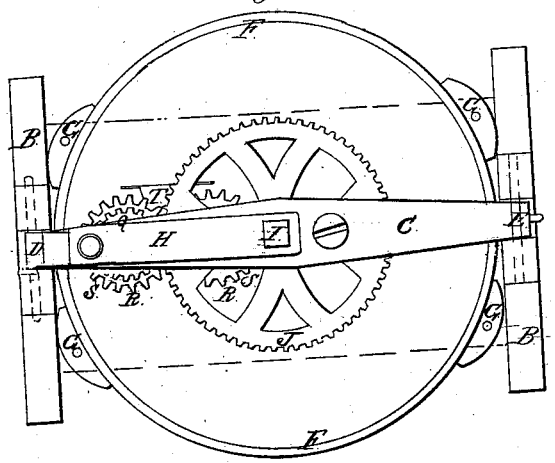
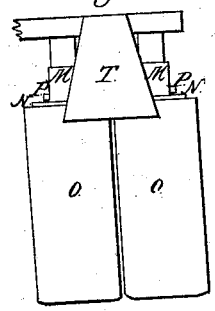
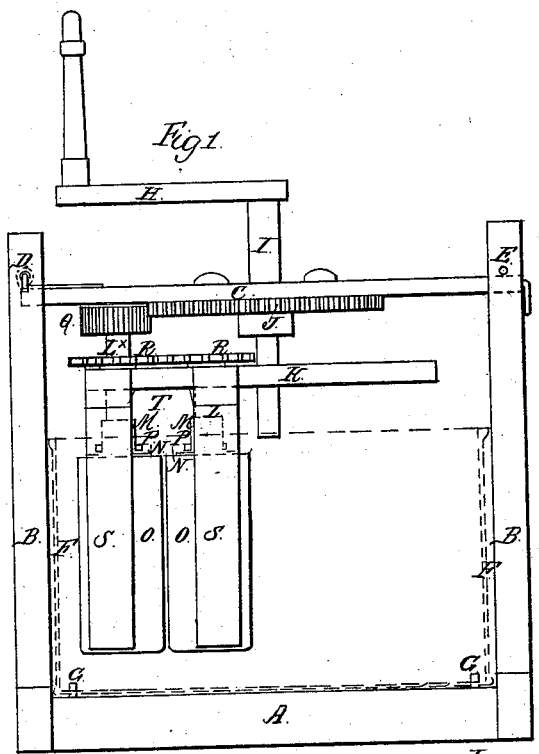
Witnesses:
Geo. Arthur Gardner
H. S. Vrooman
Inventors:
Geo. Clark Jr.
Lemuel P. Jenks

UNITED STATES PATENT OFFICE.

GEO. CLARK, JR., OF DORCHESTER, AND LEML. P. JENKS, OF BOSTON, MASS.

IMPROVED MACHINE FOR MIXING DOUGH.

Specification forming part of Letters Patent No. 52,678, dated February 20, 1866.

*To all whom it may concern:*

Be it known that we, GEO. CLARK, Jr., of Dorchester, Norfolk county, State of Massachusetts, and LEMUEL P. JENKS, of Boston, Suffolk county, same State, have invented a new and Improved Machine for Kneading or Compounding Bread or Dough and other Substances; and we do hereby declare that the following is a full and exact description of the same, taken in connection with the accompanying drawings, with the letters of reference marked thereon, which together form our specification.

The object of the machine is to take the flour and other substances which go to the composition of bread, and, by means of mixing and kneading the same, to make a homogeneous compound fitted for baking. It is useful, also, for making other mixtures.

In the drawings annexed, Figure 1 is a view from the side. Fig. 2 is a view from above, and Fig. 3 is a side view of a portion of the machinery.

In the drawings, A, Fig. 1, is the platform. B B, Fig. 1, are the standards. C is a bar supported by the hinge D, Fig. 1, on the left-hand standard, fitting at its other end into the slot of the right-hand standard B, (seen in Fig. 2,) and there confined by the bolt E, Figs. 1 and 2.

F F, Figs. 1 and 2, is the pan in which the bread is made. G G G G, Fig. 2, are the four ears by which the pan F F is held to the platform A by four pins, respectively, proceeding upward therefrom. H, Figs. 1 and 2, is the crank by which motion is communicated to the machine. This shaft is firmly fastened to the shaft I, Figs. 1 and 2, which shaft is supported by and plays in the center of the bar C, passing through the center of the cog-wheel J, Figs. 1 and 2, which cog-wheel is firmly fastened to the bar C and does not rotate. The shaft I, proceeding downward, holds at its lower end the bar K, (called the "working bar,") which bar K bears at one side two upright shafts, $L^\times$ L, which play loosely on it. The shafts $L^\times$ L bear each a roller, O O, which rollers proceed nearly to the bottom of the pan F F, and are fastened to the two shafts $L^\times$ L by a tube on each roller M M, attached by their lower ends to a plate, N N, Figs. 1 and 3, which plates are firmly screwed to the rollers O O, and are held to the shafts $L^\times$ L by two pins P P, Figs. 1 and 2.

Q, Figs. 1 and 2, is a cog-wheel, whose axis is vertical, firmly fixed to the shaft $L^\times$, (the outermost shaft,) which cog-wheel Q gears with the fixed cog-wheel J, and when the crank H is rotated rotates the shaft $L^\times$.

R R are two cog-wheels, gearing together, (seen in Figs. 1 and 2,) firmly attached to the two roller-bearing shafts $L^\times$ L, and when, by means of the turning of the crank H, the cog-wheel Q rotates, carrying with it one of the cog-wheels R, the other cog-wheel also rotates, the two rollers thus both rotating together, and also gyrating round the center of the whole machine.

S S, Figs. 1 and 2, are two scrapers, to free the rollers O O from the dough. They are fastened to the bar K, and, proceeding downward, their edges almost impinge upon the two rollers O O, and as the rollers O O rotate the scrapers S S scrape off the dough, which drops down in the bottom of the pan.

T, Figs. 1, 2, and 3, is a piece of metal fixed to the bar K, and proceeding downward till it reaches below the top of the rollers O O, bent at right angles toward them and nearly reaching them. This arrangement (seen in full in Fig. 3) prevents the dough, as it is borne forward before the rollers O O, from mounting to the tops of the rollers and interfering with their turning.

We sometimes use a vertical scraper on that end of the working bar K which is opposite to the rollers, the said scraper being inclined diagonally to the axis of the bar, and being useful for scraping the inside of the pan during rotation, and also for assisting in mixing.

The operation of the machine is as follows: The flour, water, yeast, &c., (or whatsoever the components may be required,) being thrown promiscuously in the pan, the crank is rotated. The two rollers, rotating on their own centers, draw in between them all the ingredients they may encounter, and as they also rotate round the center of the pan all the contents of the pan are successively exposed to their action. After sufficient action of the machine the bolt which holds the rollers down is withdrawn, and the bar C being lifted up by the hinge D, the pan is withdrawn, the rollers having been scraped clean by the action of the scrapers, and the dough is taken from the pan, as with any other bread-kneading pan, fitted for baking. The rollers are lifted up, and one passage of a knife along the surface of each of the scrapers frees them from any dough left on them, and the pins being then withdrawn, the rollers are taken from the machine at pleasure to be washed.

What we claim herein as of our own invention, and desire to secure by Letters Patent, is—

1. The arrangement of two vertical rollers, rotating on their own centers, and at the same time rotating round the center of the containing pan, substantially as and for the purpose described.

2. The arrangement of rotating rollers, not touching the bottom of the pan, and the removable pan, substantially as and for the purpose described.

3. The arrangement of a rotating shaft or shafts, removable from the dough-containing pan, by means of the turning of the shaft-bar, which sustains them upon a hinge, substantially as and for the purpose described.

4. The combination of a vertical rotating stirrer or stirrers with a scraper or scrapers to clean them, substantially as and for the purpose described.

5. The arrangement of a vertical stirrer or stirrers when the same is or are removable from their respective shafts, substantially as and for the purpose described.

6. The bent plate above mentioned to prevent the dough reaching the tops of the rollers, used substantially as and for the purpose described.

7. The general combination and arrangement of the whole machine, substantially as and for the purpose described.

GEO. CLARK, JR.
LEMUEL P. JENKS.

Witnesses:
GEO. ARTHUR GARDNER,
H. S. VROOMAN.